United States Patent [19]

Kobelt

[11] Patent Number: 4,488,343

[45] Date of Patent: Dec. 18, 1984

[54] MOUNTING ASSEMBLY FOR FLUID ACTUATED COMPONENTS AND METHOD FOR CONNECTING SAID COMPONENTS THERETO

[76] Inventor: Jacob Kobelt, 6110 Oak St., Vancouver, British Columbia, Canada, V6M 2W2

[21] Appl. No.: 378,437

[22] Filed: May 7, 1982

[51] Int. Cl.[3] .................... B21D 53/00; B21K 29/00; B23P 15/26

[52] U.S. Cl. .................... 29/157.1 R; 29/469; 29/DIG. 26; 137/271; 285/137 R; 285/150

[58] Field of Search .................... 285/137 R, 150; 137/269, 271; 29/157 R, 469, 157.1 R, DIG. 26

[56] References Cited

U.S. PATENT DOCUMENTS

| | | | |
|---|---|---|---|
| 2,834,368 | 5/1958 | Gray | 137/271 |
| 3,215,158 | 11/1965 | Bass, Jr. et al. | 137/269 |
| 3,467,124 | 9/1969 | Simson | 29/157 R |
| 3,509,904 | 5/1970 | Olson | 137/269 |
| 3,516,442 | 6/1970 | Munroe | 137/269 X |
| 3,654,960 | 4/1972 | Kiernan | 137/271 X |
| 3,698,432 | 10/1972 | Kutz | 137/271 X |
| 3,747,628 | 7/1973 | Holster et al. | 137/269 |
| 3,760,844 | 9/1973 | Olson et al. | 29/157.1 R |
| 3,766,935 | 10/1973 | Clippard | 137/269 |
| 3,786,831 | 1/1974 | Clippard | 137/269 |
| 3,817,269 | 6/1974 | Raymond | 137/269 |
| 3,863,666 | 2/1975 | Bonne et al. | 137/269 |
| 3,866,625 | 2/1975 | Kemner et al. | 137/269 |
| 3,881,513 | 5/1975 | Chang | 137/271 |
| 3,888,518 | 6/1975 | Delessert | 285/137 R |
| 3,915,194 | 10/1975 | Friedrick | 137/271 X |
| 3,934,605 | 1/1976 | Legris | 137/271 |
| 3,967,640 | 7/1976 | Bianchetta | 137/269 |
| 4,066,099 | 1/1978 | Witten | 29/157.1 R |
| 4,080,983 | 3/1978 | Stumpmeier | 137/271 |
| 4,082,324 | 4/1978 | Obrecht | 285/137 R |
| 4,089,549 | 5/1978 | Vyse et al. | 285/137 R |
| 4,125,278 | 11/1978 | Hargraves | 285/137 R |
| 4,170,214 | 10/1979 | Gill et al. | 137/269 |
| 4,171,559 | 10/1979 | Vyse et al. | 285/137 R |
| 4,183,373 | 1/1980 | Kay | 137/271 |
| 4,247,133 | 1/1981 | Möller | 285/137 R X |
| 4,392,677 | 7/1983 | Hardouin | 285/137 R |
| 4,404,989 | 9/1983 | LeMoine | 285/137 R X |

FOREIGN PATENT DOCUMENTS

| | | | |
|---|---|---|---|
| 2403479 | 5/1979 | France | 137/269 |

*Primary Examiner*—Mark Rosenbaum
*Assistant Examiner*—Ronald S. Wallace
*Attorney, Agent, or Firm*—Carver & Co.

[57] ABSTRACT

A mounting assembly for coupling together a plurality of fluid actuated components utilizing a pressurized fluid which provides a versatile structure to enable easy customizing of control systems. Each component has ports to receive and to discharge fluid when secured to the mounting assembly. The assembly has a main face with at least a first face recess separated from an adjacent second face recess by a partition, a portion of the partition being adapted to be removed to provide communication between the first and second face recesses. The assembly also has input and output connecting recesses adapted to receive and to discharge fluid and to communicate with the face recesses. The assembly includes an intermediate plate fitted and sealed between the components and the mounting plate to seal portions of the recesses to form passages through the mounting assembly. The intermediate plate has openings adapted to register with the ports of the components and to communicate with particular adjacent face recesses within the mounting plate as required. This structure eliminates connecting tubes between components and also permits easy connection together of other mounting assemblies for increased versatility of the invention. The connecting recesses are preferably provided in edge portions of the plate to be drilled as required to provide communication with particular face recesses, and, when aligned and sealed with a similar connecting recess in an adjacent plate, permits communication of fluid pressure between adjacent plates.

13 Claims, 10 Drawing Figures

MOUNTING ASSEMBLY FOR FLUID ACTUATED COMPONENTS AND METHOD FOR CONNECTING SAID COMPONENTS THERETO

BACKGROUND OF THE INVENTION

1. Field of the Invention

The invention relates to a mounting assembly for fluid actuated components utilizing a pressurized gas or liquid, in particular for components connected together in a pneumatic circuit for producing time delays in marine control systems.

2. Prior Art

Fluid actuated circuits have been used for many years to control propulsion systems, power units, etc., particularly in applications where a manually operated control device is remote from the power unit it is controlling. In marine power plants where a diesel engine powers a vessel through a reversible gearbox, it is usual to provide several control stations remote from the engine and gearbox, for example on the vessel's bridge and in the engine room, and possibly at other stations on the vessel. These several control stations can be connected together and to the engine and gearbox through pneumatic lines. A typical application would be in a single or twin lever control used to control an engine from idle to full throttle, and the gearbox from neutral, to forward and reverse positions. Because the components of a gearbox and propeller shaft can have considerable inertia, it is common to incorporate into the circuit means to delay the receiving of a later command signal at a component until an earlier commenced function has been completed. Such delays are necessary, for example to avoid damage to a gearbox when the manual control is shifted quickly from full ahead to full astern without first allowing the propeller shaft to become stationary before reversing the gearbox. In emergency situations, or with unskilled operators, a fast shifting of a gearbox from full ahead to full astern would normally result in considerable damage to the propulsion system and thus accumulators, relay valves, etc. are commonly provided to ensure that the command signals are received by the various components in a particular sequence, so that an earlier command is completed before a later command is initiated. This type of delay system thus has applications for applying a brake to the propellor shaft when the gearbox receives reversing signals. Other applications include the use of a relay valve where a gearbox is adapted to receive either of two possible signals, but only one signal must be received at a particular time. Still other applications relate to a throttle delay circuit which ensures positive engagement of the clutch before the throttle signal reaches the actuator to accelerate the engine. Other typical circuits include a throttle boost which temporarily raises the engine speed during clutch engagement, and sometimes for a short period after clutch engagement, so as to prevent the engine from stalling due to increased load on the engine.

As can be seen from the above, there are several circuits which can be used singly, or in combination with each other, in a typical marine propulsion assembly. In the past, it has been common to fasten the various components, such as relay valves, shutter valves, accumulators, etc. to a mounting board and to use suitable lengths of flexible pipe or hose interconnecting the various components in the required sequence. As each customer usually has different requirements, the circuits require individual design and manufacturing termed "customizing" and, in many cases this is time consuming and costly. Furthermore, it is not uncommon for a previously installed system to be updated later by adding on additional components for extra features, and this requires either incorporating the additional components into the existing system, which can be difficult, or sometimes a complete rebuilding of the mounting assembly is required, thus incurring additional costs.

To reduce the above problems, it is known to provide a versatile customized mounting plate with a series of grooves in a front face thereof, the grooves intersecting at intersections having enlarged recesses to receive, as required, resilient plugs. A gasket and plate perforated with communication and fastening holes can then be fastened to the front face of the mounting plate to provide passages to openings on the rear face of the plate, and short lengths of "jumper" pipes extend from the openings on the rear face of the plate to interconnect the components. The circuit is customized by assembling the various components as required which communicate with particular grooves and then plugging with the resilient plugs particular intersections through which no pressurized fluid is to flow. When using this structure, high labour costs are incurred for fitting the jumper pipes and difficulties can be encountered due to a limit on the number of possibilities of passage arrangements. Also fluid can leak passed the resilient plugs which produces loss of air or undesirable interactions between components.

SUMMARY OF THE INVENTION

The invention reduces the difficulties and disadvantages of the prior art by providing a mounting assembly with passages to which the fluid actuated components can be fastened. A face of a mounting plate of the assembly provides communication between various components through recesses in the face which are separated by partitions. Edge portions of the mounting plate contain connection recesses to receive fluid into, and to discharge fluid from, the plate. Customizing of a mounting assembly to attain a particular circuit merely requires simple removal of portions of partitions between recesses, drilling connecting recesses, and in some cases, drilling an opening in a gasket and an intermediate plate held against the face to form passages and communication with the components. This eliminates the leakage problems commonly associated with the prior art mounting assemblies using resilient plugs in recesses for sealing purposes, and also eliminates the cutting and bending of jumper pipes connecting components together.

A mounting assembly according to the invention is for coupling together a plurality of fluid actuated components utilizing a pressurized fluid. Each component has a mounting base with ports to receive and discharge fluid, and is adapted to be secured to the mounting assembly. The mounting assembly with fasteners includes a mounting plate and an intermediate plate adapted to be secured and sealed together. The mounting plate has a main face with a first face recess separated from an adjacent second face recess by a partition. The recesses are within the face and have open outer portions and closed inner portions. A portion of the partition is adapted to be removed to provide communication between the first and second face recesses. The mounting plate has edge portions with edge faces disposed generally perpendicularly to the main face and containing input and output connection recesses adapted to receive and to discharge fluid respectively, and to communicate with the face recesses as required. The connection recesses have central axes within a plane disposed parallel to the main face of the plate, the plate also having fastener openings to receive the fasteners for securing the components to the assembly. The intermediate plate is adapted to fit between the components and the mounting plate so as to seal open outer portions of the face recesses to form passages through the mounting assembly. The intermediate plate is relatively thin and has communication openings therein adapted to register with the ports of the components and to communicate with particular adjacent face recesses within the mounting plate as required. The intermediate plate has clearance openings to accept the fasteners.

A method according to the invention is for connecting together on a mounting assembly a plurality of fluid actuated components as above described. The method includes providing a mounting plate having a main face with a first face recess separated from an adjacent second face recess by a partition. The recesses are within the main face and have open outer portions and closed inner portions. The mounting plate also has edge portions with edge faces disposed generally perpendicularly to the main face and containing input and output connection recesses adapted to receive and to discharge fluid respectively. The connection recesses have central axes within a plane disposed parallel to the main faces of the plate. The mounting plate also has fastener openings to receive the fasteners for securing the components to the assembly. The method further includes removing a portion of the partition between the first and second face recesses to provide communication between the two face recesses, and removing material if required to permit the input and output connection recesses to communicate with the face recesses as required. The method also includes forming the mounting assembly by fitting a relatively thin intermediate plate between the components and the mounting plate so as to seal portions of the face recesses to form passages through the mounting assembly. The intermediate plate has communication openings therein to register with the ports of the components and adjacent face recesses as required to permit communication between the recesses and the components. The intermediate plate also has clearance openings to accept the fasteners. The components and intermediate plate are secured to the mounting plate by passing the fasteners through the component and the clearance openings of the intermediate plate and into the mounting plate, so as to form an assembly in which the components are interconnected as required, and fluid passes from the input connecting recess through the component and face recesses as required and leaves the assembly through the output recess.

A detailed disclosure following, related to drawings, describes various embodiments of the invention in apparatus and method, which are capable of expression in apparatus and method other than those particularly described and illustrated.

DETAILED DISCLOSURE

FIGS. 1 through 5

Figures 1, 2, 3, 4:
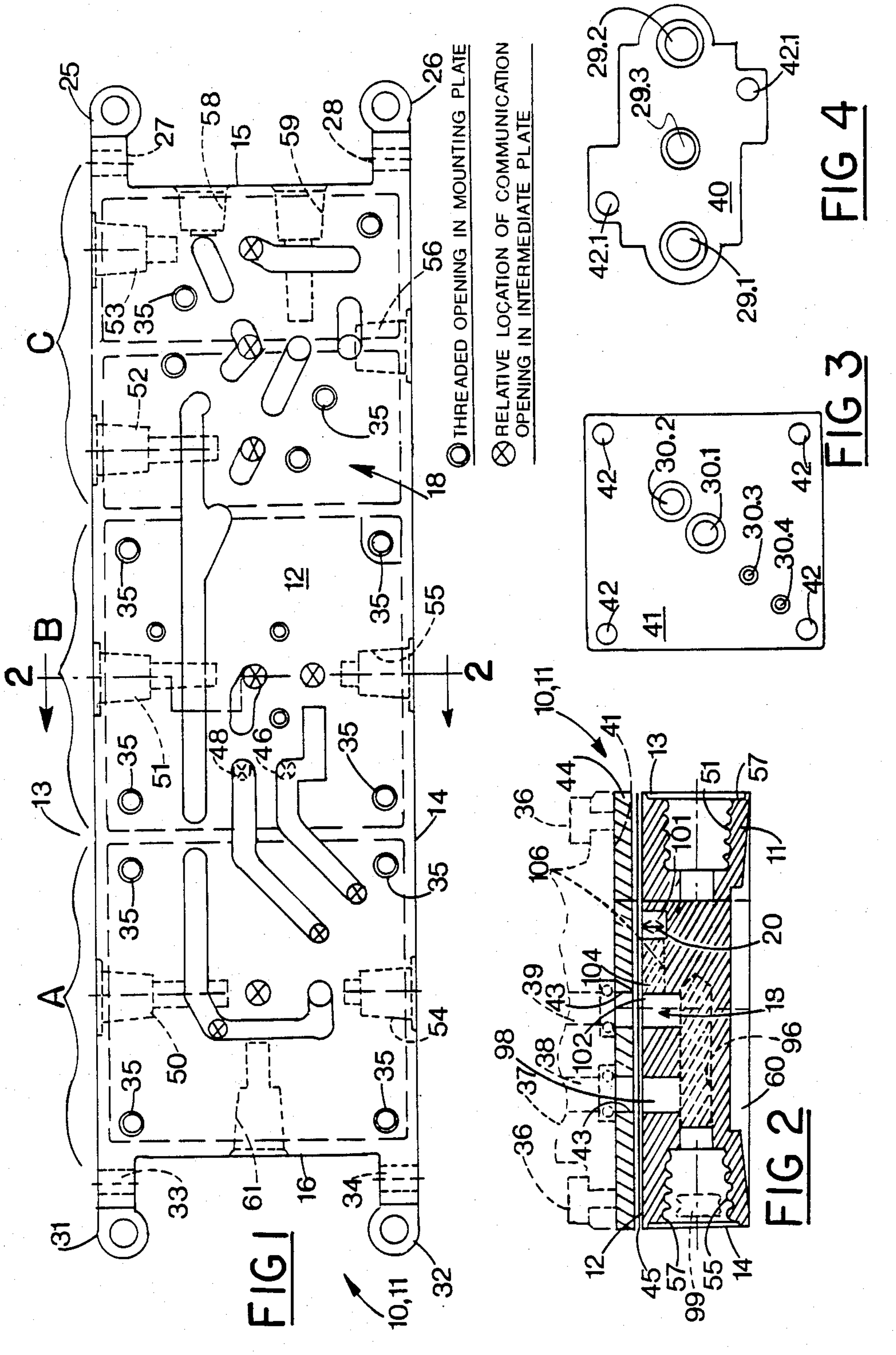
FIG. 1 is a simplified, partly diagrammatic, top plan view of a mounting plate according to the invention by itself prior to metal removal, showing locations of three components thereon.
FIG. 2 is a simplified fragmented section generally on line 2—2 of FIG. 1 showing the mounting plate, in combination with an intermediate plate, gasket and portions of a accumulator tank assembly mounted thereon; and also showing some areas of metal removal as seen generally on line 2—2 of FIG. 7.
FIG. 3 is a simplified plan view of a mounting face of a relay valve.
FIG. 4 is a simplified plan view of a mounting face of a shuttle valve.

A mounting assembly 10 according to the invention has a mounting plate 11 having a main face 12 defined by first and second edge portions 13 and 14 interconnected by third and fourth edge portions 15 and 16. The first and second edge portions are parallel to each other, and the third and fourth edge portions are parallel to each other and disposed at right angles to the first and second edge portions to form a generally rectangular mounting plate with brackets as will be described. Thus the first and second edge portions are spaced apart on opposite sides of the mounting plate, as are the third and fourth edge portions. The main face has a plurality of face recesses 18 which are within the face and have open outer portions and closed inner portions, and some of which, as seen in FIG. 2, extend to a depth 20 below the main face 12 and, are disposed in a particular pattern or layout as seen in FIG. 1 for purposes as will be described. The mounting plate has brackets 25 and 26 adjacent and extending from the third edge 15, the brackets having outer faces thereof disposed generally flush with the first and second edge portions 13 and 14 and respective coupling bores 27 and 28 aligned with each other and disposed parallel to the edge portion 15. The mounting plate also has brackets 31 and 32 adjacent and extending from the fourth edge portion 16, the brackets having outer faces thereof disposed generally flush with the first and second edge portions 13 and 14 and having coupling bores 33 and 34 respectively aligned with each other and disposed parallel to the fourth edge portion 16.

The brackets 25, 26, 31 and 32 and associated coupling bores and threaded means, not shown, serve as connecting means adjacent the third and fourth edge portions which are adapted to connect similar mounting plates together to form a mounting plate composite assembly as will be described with reference to FIGS. 9 and 10.

The mounting assembly is for coupling together a plurality of fluid actuated components utilizing a pressurized fluid, for example relay valves, an accumulator tank and in some applications, a shuttle valve. Each of these components is known and thus is not shown in detail, and each has a mounting face which is adapted to be secured to the mounting assembly using threaded openings 35, termed fastener openings and complementary holddown screws 36 or equivalent fasteners, as shown in FIG. 2. The mounting face of each pneumatic component has ports to receive and discharge fluid, the ports including at least one input and one output port. Some components have other ports, eg. one or two pilot pressure input ports, and all the ports have peripheral seals as is well known in the trade to cooperate with respective passages as will be described. A typical fluid actuated component is shown partially in FIG. 2 and in this example, is an accumulator tank assembly 37 which has two ports 38 and 39, shown in broken outline, and these cooperate with the mechanism within the interior of the accumulator tank itself as will be described. Referring to FIG. 3, another pneumatic component, in this example, a relay valve has a generally square mounting face 41 having four clearance openings 42 to receive hold down screws, and four ports 30.1 through 30.4. The ports 30.1 and 30.2 are input and output ports, and the ports 30.3 and 30.4 are normally open and normally closed pilot input ports respectively. Undesignated O-ring seals are fitted around the various ports in the mounting bases so as to seal against an adjacent surface. Referring to FIG. 4, a shuttle valve has a mounting face 40 with two clearance openings 42.1, two input ports 29.1 and 29.2, and one output port 29.3.

Figure 5:
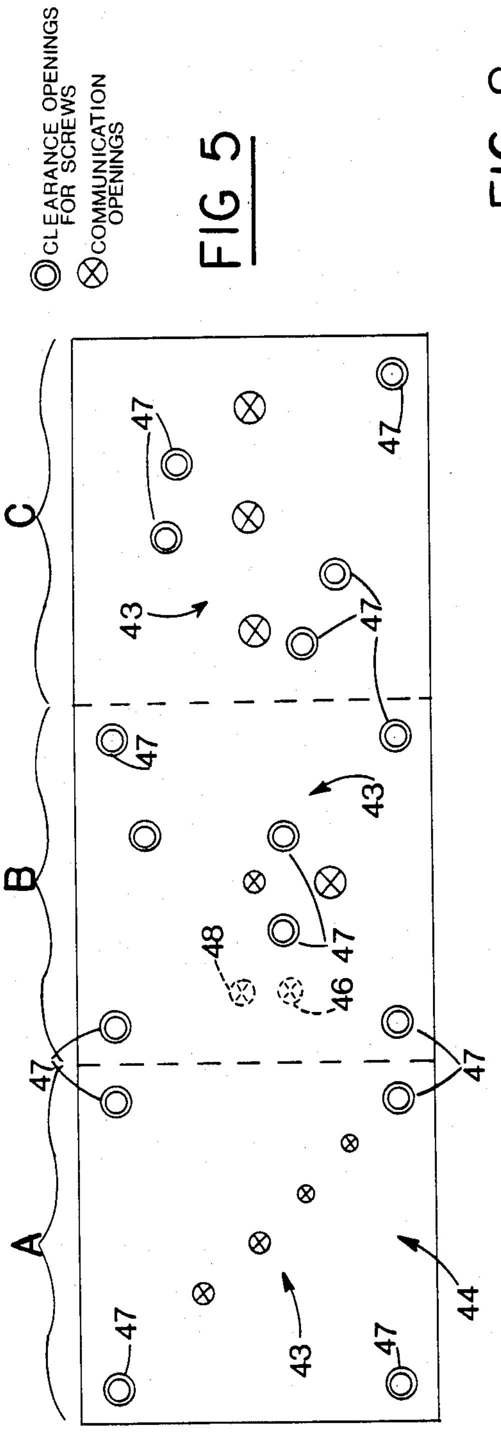
FIG. 5 is a simplified, partly diagrammatic, top plan view of the intermediate plate showing locations of openings to suit particular purposes.

The mounting assembly also includes a relatively thin intermediate plate 44 which is adapted to fit between the components and the mounting plate, but for clarity is shown partially separated in FIG. 2. When fitted against the face 12, the plate 44 closes off or seals open outer portions of the recesses to form passages within the mounting plate as will be described. A gasket 45, also shown separated in FIG. 2 only, is fitted between the mounting plate and the intermediate plate so as to provide an adequate seal between the opposed surfaces of the plates. As seen in FIG. 5, the intermediate plate is perforated and has a plurality of openings 43 therein, which are adapted to register with the particular ports of the pneumatic components and communicate with the particular adjacent recesses within the mounting plate as required. The openings 43 are termed communication openings and each opening is drawn in FIG. 5 as one circle with a multiplication cross inscribed therein. When the plates 11 and 44 are fitted together, positions of the openings 43 relative to the plate 11 are shown in FIG. 1 as multiplication crosses within circles, so to show registration of the opening 43 with particular passages or recesses. The plate 44 also has a plurality of clearance openings 47 to register with the openings 35 to receive the hold down screws 36 for securing the components to the plate 11 and also to hold the plate 44 against the face 12 to prevent leakage. The gasket 45 is similarly perforated to provide communication and clearance openings for the screws 36. The plate 44 has two optional communication opening positions 46 and 48 which are shown in broken outline in both FIGS. 1 and 5, either one of which openings is drilled or punched for communication with a particular recess in the plate in certain circuits as will be described. The openings 47 are drawn as two concentric circles in FIG. 5, and when the plates 11 and 44 are fitted together, positions of the openings 47 relative to the openings 35 of the plate 11 are shown in FIG. 1 as two concentric circles.

As seen in FIG. 1, the mounting plate 11 is divided longitudinally into three distinct sections designated A, B and C. The section A is adapted to receive one of four different types of relay valves, depending on the application, the relay valves being either a normally open type or a normally closed type, using either a single pilot input or a dual pilot input. The relay valves have identical mounting bases and location of ports and mounting openings so as to be interchangeable if desired on the mounting plate. The section B is adapted to receive the accumulator tank assembly which, in this instance, includes in combination with a fluid reservoir, a reversible check valve and an adjustable or fixed fluid flow control. The accumulator assembly has an open base which is sealed by clamping against the intermediate plate, thus providing easy communication with the interior of the accumulator tank itself, and further includes two ports 38 and 39 of FIG. 2 which communicate with the check valve and with the fluid flow control respectively. The accumulator tank assembly is used in applications where a time delay is required and it is preferable to have the check valve of the assembly 37 reversible so that the time delay can be obtained during either air pressure build up or air exhaust. Section C, if used, is adapted to receive a shuttle valve, which, as seen in FIG. 4, has two input ports and one output port. The shuttle valve uses only two hold down screws and can be omitted in certain circuits as is well known. The shuttle valve is used in an application where two signals must exit through a common line, for example a forward or reverse signal being transmitted to a gearbox, or a throttle boost signal or a throttle delay signal being transmitted to a throttle.

The purpose of the present invention is to provide a versatile control assembly which can be used for many different circuits, the purpose of which can be easily varied depending upon which components are selected for securing to the mounting plate. Furthermore, two or more mounting plate assemblies can be coupled together to form many more different configurations, and when so assembled are termed composite mounting assemblies, which further increase the number of possible combinations of circuits. This is attained by providing a basic mounting plate with a selected pattern of face recesses 18 positioned on the main face 12 as shown, the preferred method of manufacture being die casting. Some of the face recesses are separated from each other, or from adjacent fluid input or output connection recesses, by partitions, portions of which can be removed to provide communication. Some of the face recesses are superficial, that is they are not penetrated automatically by drilled extensions of connection recesses. However, if required, the superficial recesses can be deepened to penetrate the connection recesses as will be described. Other face recesses are deeper in the plate, and are penetrated automatically by drilled extensions of the connection recesses.

The first edge portion 13 has four connection recesses 50, 51, 52 and 53, and the second edge portion 14 has three connection recesses 54, 55 and 56. The third edge portion 15 has two connection recesses 58 and 59 and the fourth edge portion has one connection recess 61. The connection recesses in edge portions of the plate are die cast, usually with blind ends, which can then be threaded, and also drilled or extended, that is adapted to communicate as required with suitable face recesses in the mounting plate or other connection recesses, which recesses either receive fluid from, or deliver fluid to, a port of a component. The connection recesses have undesignated central axes disposed within a plane parallel to the main face of the plate, and the edge portions have undesignated edge faces disposed generally perpendicularly to the main face and containing the connection recesses. If necessary, several components can communicate with the same recess which can then communicate in series or in parallel with other components.

As best seen in FIG. 2, the connection recesses 51 and 55 have internal threads 49 to connect to threaded hose couplings leading from an air supply, or to or from another component as required, or, if drilled for communication, can be plugged with a threaded plug if the connection recess is not required. This versatility is of particular importance as it permits easy changes without return of the assembly to a workshop for remachining, or substitution of the mounting plate. FIG. 1 does not disclose much hidden detail relating to disposition of additional material for the face recesses and connection recesses on a rear face 60 of the plate remote from the face 12. However, sufficient material is provided to extend between the connecting recesses 51 and 55 which are aligned, so as to permit a straight transverse bore, not shown, to extend across the plate to interconnect the recesses 51 and 55, which bore is required in certain circumstances as will be described with reference to FIG. 10. Also, as seen in FIG. 2, the connection recesses 51 and 55 have annular grooves 57 within the edge faces thereof to receive a seal, not shown, which is required when using the connection recesses in most applications.

Figure 6:
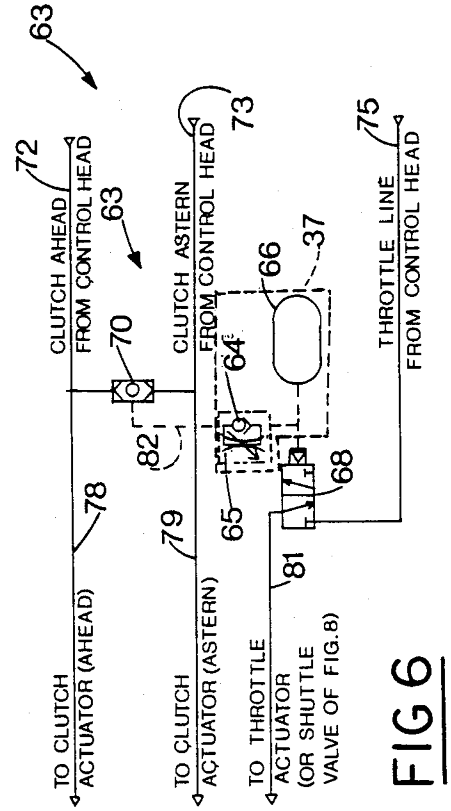
FIG. 6 is a pneumatic schematic of a throttle delay circuit.
Figures 7, 10:
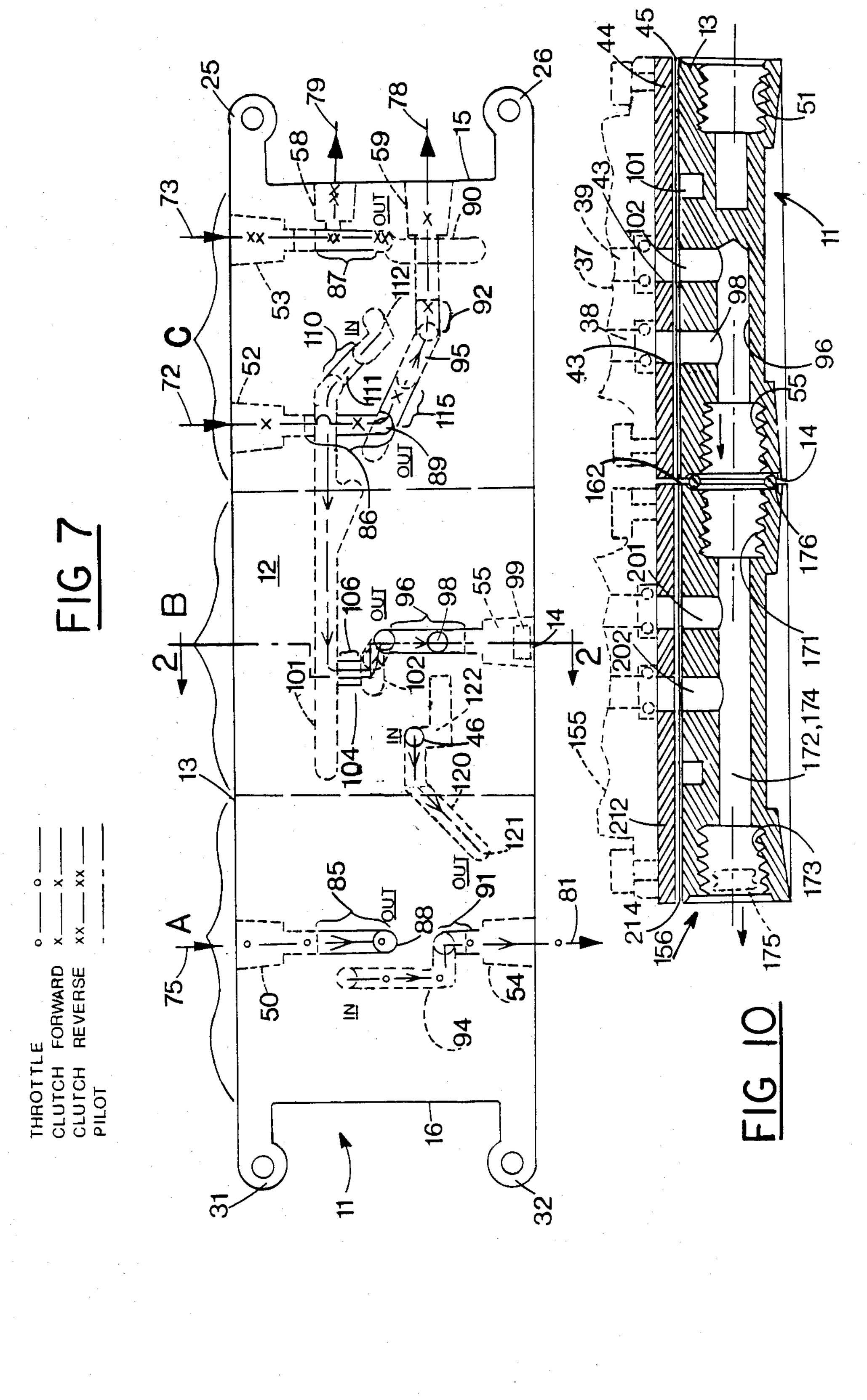
FIG. 7 is a simplified top plan diagram of the mounting plate showing visible and some hidden details of specific areas of metal removal and use of existing conduits for the throttle delay circuit of FIG. 6, other details being omitted for clarity.
FIG. 10 is a simplified transverse section at enlarged scale on line 10—10 of FIG. 9, showing the two intermediate plates and gaskets and portions of adjacent components secured to the mounting assembly.

FIGS. 2, 6 and 7

A first example of the present invention is a throttle delay circuit 63 shown schematically in FIG. 6 and described as follows. As previously stated, the accumulator tank assembly 37 incorporates within a conventional fluid reservoir or fluid tank 66 a reversible check valve 64 and an adjustable fluid flow control 65 fitted in parallel, and occupies section B of the plate 11. The circuit 63 includes a normally-closed, adjustable single air pilot, spring-return, two-position, three-way relay valve 68 which occupies section A of the plate, and a shuttle valve 70, which is also termed a two-way check valve, which occupies section C of the plate. The circuit is adapted to receive three input signals from a control head, not shown, namely clutch ahead and astern signals in fluid lines or conduits 72 and 73, and a throttle signal in line 75. The circuit has three output signals to respective actuators, not shown, namely clutch ahead and clutch astern output signals in lines 78 and 79, and a throttle signal in line 81. A pilot output signal line 82 extends from the shuttle valve 70 to the assembly 37 to transmit the higher pressure clutch signal.

FIG. 7 is highly simplified and diagrammatic and shows in broken outline only those face recesses and connection recesses which are used in the particular circuit. Direction and routing of particular pneumatic signals are shown as coded broken lines representing the throttle signal, forward and reverse clutch signals and pilot pressure signal and it should be understood that the actual value of air pressure in a signal representation as above can change during passage through the assembly. The clutch signal input lines 72 and 73 are shown connecting with the connection recesses 52 and 53, and the throttle signal input line 75 connects with the connection recess 50, all recesses being input connection recesses in the first edge portion 13. The clutch signal output lines 78 and 79 for ahead and astern connect to the connection recesses 59 and 58 respectively in the third edge portion 15, and the throttle signal output line 81 connects to the connection recess 54 in the second edge portion 14. The connection recesses are cast blind and are extended by a simple drilling operation to communicate with appropriate face recesses in the face 12 or passages which are adjacent ends of the face recesses, and for clarity the drilled extensions are shown in FIG. 7 as full lines. Thus the input connection recesses 50, 52 and 53 are drilled to form passage extensions 85, 86 and 87 respectively to communicate with face recesses 88, 89 and 90 respectively. The output connection recesses 54 and 59 are drilled to form passage extensions 91 and 92 to communicate with face recesses 94 and 95 respectively. It is noted that the drilled passage extension 87 of the input connecting recess 53 penetrates the output connection recess 58 so that there is a clear communication between the recesses 90, 53 and 58. If the extension 87 does not clearly penetrate the recess 58, the recess 58 can be drilled to produce a suitable extension. As also seen in FIG. 2, the connection recess 55 is drilled to form a passage extension 96, and face recesses 98 and 102, after deepening by drilling if necessary, are seen to communicate with the extension 96. A threaded plug 99 is fitted in the recess 55 to seal the end of the recess 55 itself against leakage because, in this embodiment, the extension 96 is required only for interconnecting the ports 38 and 39 of the assembly 37.

Three specific portions of partitions between adjacent face recesses are now removed to provide communication, by way of interconnecting recesses which are shown in full outline in FIG. 7, between ports of components and input and output lines as follows. In section B, a face recess 101 and the face recess 102 are designated first and second face recesses and are separated by a partition 104. A portion of the partition 104 is adapted to be removed, for example by a milling, filing or other metal removal process, to form a first interconnecting recess 106 which provides communication between the first and second recesses. This permits air under pressure in recess 101 to pass through the interconnecting recess 106 so as to communicate with the recess 102. A portion of structure adjacent the connecting recess 106 is seen in FIG. 2, where it is seen that the face recess 101 is superficial and would not be penetrated by extensions of either of the connection recesses 51 or 55. In section C, a similar second interconnecting recess 110 is made in a partition 111 between an opposite end of the first face recess 101 and a third face recess 112. A similar third interconnecting recess 115 is made in a partition between the face recesses 89 and 95, the recesses 89, 115 and 95 thus interconnecting the drilled extensions 86 and 92 of the connection recesses 52 and 59. There is no requirement for removing partitions between adjacent recesses in section A.

The three interconnecting recesses as above specified are selected to provide the necessary connections so that appropriate ports in the three components are interconnected in the manner of the FIG. 6 schematic. In FIG. 5, openings of the intermediate plate are positioned as shown in FIGS. 1 and 5 relative to the particular recesses in use so that when the plates 11 and 44 are connected together, the ports of the components communicate with the respective recesses via the openings in the plate 44. This correspondence of openings in the plate 44, the ports of the pneumatic components, and particular recesses in the plate 11 is of prime importance to the invention, and clearly, exact location is critical. In the description following, the openings in the intermediate plate 44 and the associated gasket 45 are ignored for simplicity.

In Section A, the face recesses 88 and 94 of FIG. 7 communicate with the inlet and outlet ports 30.1 and 30.2 of the relay valve base of FIG. 3. In FIG. 7, a face recess 120 has one end 121 in section A in communication with the normally closed pilot input port 30.4 of the valve base of FIG. 3, and an opposite end portion 122 in section B in communication with the interior of the accumulator tank assembly through the optional opening 46 in the plate 44, which opening is shown in full outline, ie. the opening 46 thus serves as an output port of the tank itself. In section B, the recess 102 is in communication with the port 39 of the tank assembly 37 leading to the fluid flow control 65 of FIG. 6, and the recess 98 is in communication with the port 38 which communicates with the check valve 64 of FIG. 6. The optional opening position 48 in the plate 44 of FIG. 5 is not used in this circuit. In section C of FIG. 7, the recesses 89 and 90 communicate with the two inlet ports 29.1 and 29.2 of the shuttle valve 70, and the recess 112 communicates with the output port 29.3 of the shuttle valve.

To clarify the flow directions, the fluid flow direction relative to the plate 11 at a particular recess communicating with an opening in the plate 44 is indicated as being IN or OUT, the direction IN meaning that air is leaving a component and entering the plate 11, the direction OUT meaning that air is leaving the plate 11 and entering a component. Thus, for example, the recess 88 is indicated as OUT, meaning that fluid is leaving the plate at the recess 88 to enter the component.

OPERATION

Initially, prior to customizing, the mounting plate is in effect an incomplete blank with the plurality of face recesses 18 in the main face thereof and blind connection recesses in edge portions thereof. The intermediate plate 44 and the gasket 45 are pre-punched with all the required openings with the exception of the optional communication openings at the positions 46 and 48. In the examples of FIGS. 6 and 7, the customer selects the particular circuit which dictates the location of the various pneumatic components relative to the recesses. Then, by reference to the particular layout, in this instance, FIG. 7, which shows interconnections between the components, the blind connection recesses in the edge portions are drilled to produce the required extensions, and portions of the partitions between the various face recesses are removed to produce the interconnecting recesses 106, 110 and 115 to provide communication between the appropriate recesses. At this stage, the optional communication opening at the position 46 is drilled in the plate 44 because it is required in the circuit as described with reference to FIGS. 6 and 7. As will be described, the optional opening at position 48 is required in an alternative circuit to be described with reference to FIGS. 8 through 10. The actual position of the optional communication opening depends upon which pilot input port of the relay valve communicates directly with the tank interior, ie. the normally open or the normally closed port. The components are now bolted onto the mounting assembly with the intermediate plate 44 and gasket 45 fitted between the components and mounting plate so as to seal portions of the recesses to form passages.

The paths of particular signals through the assembly are now described. In the throttle delay circuit 63 of FIGS. 6 and 7, clutch signals in the lines 72 and 73 from the control head enter the mounting plate assembly through the input connection recesses 52 and 53 and pass to the shuttle valve in section C. The signal at higher pressure, for this example it will be selected as an ahead signal, enters the plate through the input connection recess 52, passes through the extension 86 and into the face recess 89 where a portion of the signal enters the shuttle valve, and another portion of the signal leaves the plate through, in sequence, the recesses 115 and 95, the extension 92, the connection recess 59 and the line 78. The clutch reverse line 73 is concurrently closed by the shuttle valve. A pilot pressure signal is generated by the first signal portion in the shuttle valve and leaves the shuttle valve via the output port thereof and passes, in sequence, through the recesses 112, 110, 101, 106 and 102, which five recesses are in total equivalent to the line 82 in FIG. 6. The pilot pressure signal divides at the recess 102 in Section B, where one portion communicates with the flow control 65 through the port 39, and the other portion communicates, through the extension 96 and the recess 98, with the check valve 64 through the port 38. The pilot signal enters the accumulator fluid reservoir 66 through the flow control 65 and, after a delay to charge up the fluid reservoir, the pilot signal leaves the accumulator through the opening 46 and the recess 120 and enters the pilot pressure input port 30.4 of the relay valve so as to open the normally closed valve. The throttle signal enters the plate 11 from the line 75 by passing, in sequence, through the recess 50, the extension 85 and the recess 88, from where it enters the central input port 30.1 of the relay valve. The throttle output signal from the relay valve output port 30.2 is controlled by the delayed pilot pressure signal from the accumulator tank and, when the pilot pressure signal is received, the throttle output signal leaves the throttle valve and the plate 11 by, in sequence, the recess 94, the extension 91 and the recess 55, to leave the plate through the line 81. As is known in prior art throttle delay circuits, the signal from the shuttle valve is delayed by the accumulator assembly so that the pilot pressure signal to actuate the relay valve occurs after the clutch has fully engaged. Also the check valve 64 in the port 37 of FIG. 2 exhausts excess fluid pressure from the reservoir 66 back into the extension 96 as required.

Thus, in summary, it can be seen that the method of the invention includes providing a mounting plate having a main face with a first face recess separated from an adjacent second face recess by a partition. The mounting assembly also has input and output connection recesses adapted to receive and discharge fluid respectively. The method further includes removing a portion of the partition between the first and second face recesses to provide communication between the two face recesses, and also removing material as required to permit the input and output connection recesses to communicate with the face recesses as required. The method includes forming the mounting assembly by fitting an intermediate plate having openings therein to register with the ports of the components and adjacent face recesses as required to permit communication between the face recesses and the components. After this, the components and intermediate plate are secured and sealed to the mounting plate so as to form an assembly in which the components are interconnected as required. Fluid passes from the input connection recess, through the components and the face recesses as required and leaves the assembly through the output recess.

ALTERNATIVES AND EQUIVALENTS

The pattern of face recesses 18 on the main face 12 and the input and output connection recesses in the edge portions are selected in accordance with the location of the input and output ports of the components, and the order of the various components spaced along the mounting plate. Clearly, many other patterns of face recesses are possible depending upon the sequence of the components and location of the ports. The mounting assembly is shown for use in a pneumatic marine control delay circuit utilizing an accumulator assembly and a relay valve in which one of the face recesses communicates with a first opening in the intermediate plate registered with the output port of the accumulator assembly, and the same face recess is in communication with a second opening in the intermediate plate in register with the pilot input port of the relay valve so that fluid in the accumulator tank communicates with the relay valve. The plate 11 is shown to be rectangular with four edge portions, each of which has an edge face disposed perpendicularly to the main face of the plate 11. Whilst this is preferred, other arrangements are possible. Preferably each mounting plate has at least one edge portion having a connection recess therein to communicate with a fluid conduit and a face recess.

Figure 8:
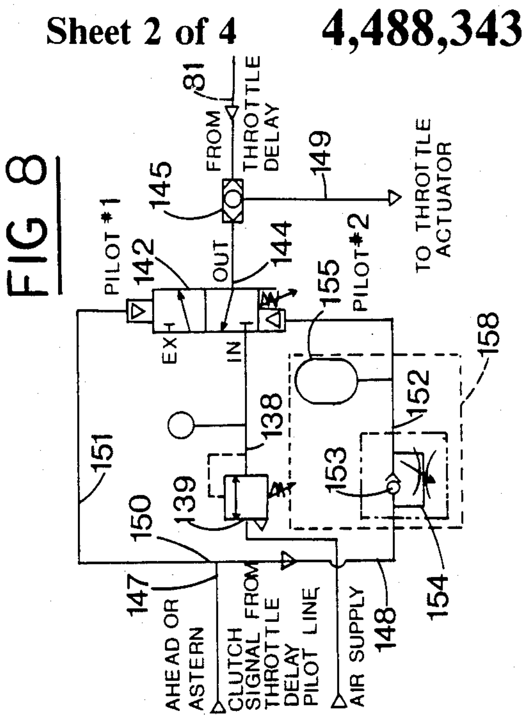
FIG. 8 is a pneumatic schematic of a throttle boost circuit.
Figure 9:
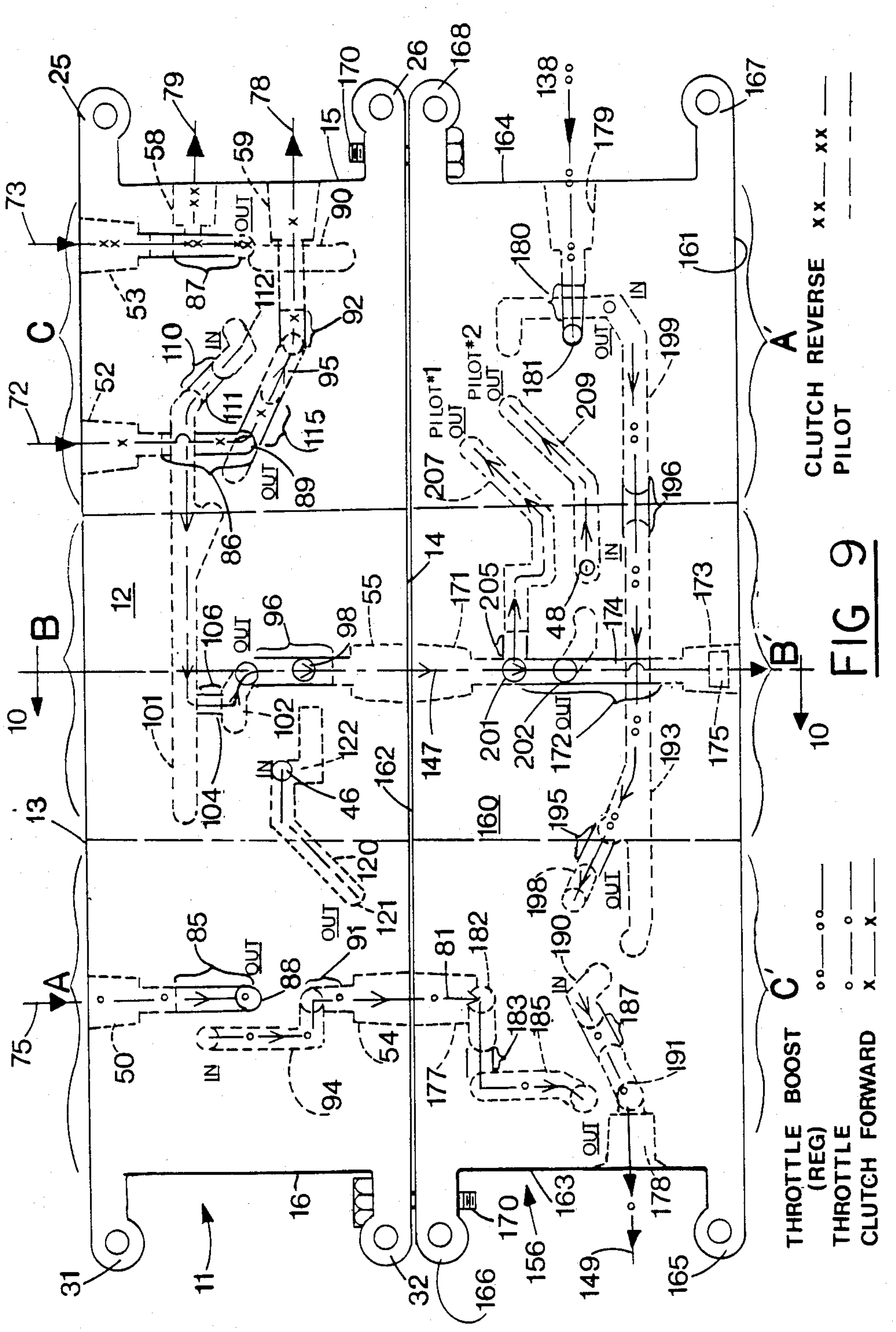
FIG. 9 is a simplified top plan diagram of two mounting plate assemblies secured together to produce a mounting plate composite assembly, showing visible and some hidden details of specific areas of metal removal and use of existing conduits for the throttle boost circuit of FIG. 8, and also use of the mounting plate of FIG. 7 to provide a throttle delay circuit, with slight modifications, other details being omitted for clarity.

FIGS. 8 through 10

A second example of use of the mounting assembly will be described for a throttle boost circuit which is usually used in conjunction with the throttle delay circuit of FIGS. 6 and 7, with a simple modification to produce a pilot pressure output from the throttle delay circuit.

Referring to FIG. 8, an air supply line 138 delivers air at a pre-determined pressure from a regulator 139 into an input port of a dual pilot, normally-closed, three-way, two-position relay valve 142. The valve 142 has an output connected with a transfer line 144 to one input port of a shuttle valve 145 having an opposite input port receiving a throttle signal in line 81 from the throttle delay circuit 63 (see FIGS. 6 and 7). The shuttle valve has an output line 149 extending to a throttle actuator, not shown, thus the actuator can only receive one signal, ie. either a throttle boost signal or a throttle delay signal, depending on which signal dominates the shuttle valve 145. Pilot input lines 151 and 152 extend to opposite pilot input ports #1 and 190 2 respectively of the relay valve 142. A check valve 153 and flow control 154 are fitted in parallel within an accumulator tank assembly 158 having a fluid tank or reservoir 155 connected to the line 152. An accumulator tank input line 148 inputs into the check valve and the flow control which in turn outputs into the line 152. A clutch signal input line 147 carrying pilot pressure from the throttle delay circuit of FIG. 6 communicates with the lines 148 and 151 at a junction 150.

Referring mostly to FIG. 9, the mounting plate 11 is again shown schematically and is shown coupled to a similar second mounting plate 156. The plate 156 has a main face 160 defined by first and second edge portions 161 and 162, and by third and fourth edge portions 163 and 164. The plate 156 has sections A', B' and C' equivalent to the sections A, B and C of the plate 11 as shown, the sections A', B' and C' receiving respectively a relay valve, an accumulator tank assembly and a shuttle valve as before. The mounting plates are positioned in a reversed orientation so that the sections A', B' and C' of the plate 156 are adjacent the corresponding sections C, B and A respectively of the plate 11. This is termed reversed orientation because the second edge portion 14 of the plate 11 is adjacent the second edge portion 162 of the plate 156. The plate 156 has brackets 165 and 166 which extend from the third edge portion 163 and similar brackets 167 and 168 which extend from the fourth edge portion 164. Aligned coupling bores in adjacent pairs of brackets, ie. the pairs of brackets 26 and 168, and the brackets 32 and 166, receive bolts 170 for coupling the two mounting plates together to form a mounting plate assembly. It can be seen that the brackets of the connecting means are generally aligned with the edge portions containing the connection recesses which are adapted to be registered with the connection recesses of the adjacent plate, and the brackets cooperate with couplers, ie. the bolts, etc. to draw the plates together to attain the registration of the connection recesses. The plug 99 which is used in FIGS. 2 and 7 to seal the connection recess 55 of the plate 11 is removed so as to expose the recess 55. A connection recess 171 in the edge portion 162 of the plate 156 is drilled to produce an extension 172 which passes uninterruptedly across the plate 156 to communicate directly with an aligned connection recess 173 in the edge portion 161, thus producing a continuous transverse bore 174 extending across the plate 156. The bores 55 and 171 communicate with each other and so the bore 174 is also exposed to pilot pressure as will be described. If pilot pressure is needed elsewhere, eg. for an optional shaft brake circuit, not shown, the recess 173 can be connected to another mounting plate carrying the shaft brake circuit. Alternatively, if the pilot pressure is not required, the recess 173 can be closed with a threaded plug 175 to prevent loss, or the extension 172 need not pass fully through the plate to communicate with the recess 173. When the plates 11 and 156 are connected together in this manner, the connection recesses 55 and 171 of the mounting plates are in registration with each other. Because the extension 96, and thus the recess 55 communicate with the pilot pressure in the recess 102 of the plate 11, the mounting plate 156 receives a pilot pressure signal from the plate 11, represented by the line 147, which eliminates the use of jumper pipes as used in the prior art. A connection recess 177 in the edge portion 162 of the plate 156 is in registration with the connection recess 54 of the plate 11.

Because the connection recesses 55 and 171 are in registration with each other when the plates are reversed, it is clear that the connecting means, that is the coupling bores of the brackets, are spaced equally on opposite sides of the relevant connection recesses to enable such reversed orientation. Clearly, the connection recesses 55 and 173 would also register with each other if the plates were disconnected and then reconnected and coupled together in the same orientation, that is when the edge portions 14 and 161 are adjacent each other and the sections A, B and C of the plate 11 are adjacent the equivalent sections A', B' and C' of the plate 156. Similarly, as previously stated in the reversed orientation as shown, the connection recess 177 in the edge portion 162, which is equivalent to the connection recess 56 of the plate II, is aligned with the connection recess 54 of the plate 11. Clearly, spacing of the relevant connection recesses from the coupling bores of the brackets is selected so as to be compatible with the two different orientations of the mounting plate so as to maintain the increased versatility as above. Thus at least some of the connection recesses on opposite edge portions of the mounting plate are spaced at equal distances from adjacent connecting means to enable coupling together of adjacent plates in either of the two orientations.

The mounting plate composite assembly of two similar mounting plates can thus receive up to a maximum of six integrated components as one unitary assembly. As stated above, additional mounting plates could also be coupled together to the composite assembly so as to increase the number of integrated components, the additional mounting plates also receiving the same pilot pressure, if necessary, through aligned transverse bores which extend across the plates and communicate with other aligned transverse bores. In FIG. 10, the adjacent edge portions 14 and 161 of the first and second mounting plates 11 and 156 have oppositely facing annular recesses to receive an O-ring seal 176 therein so as to prevent leakage of pilot pressure across the connection.

Thus, in summary, it can be seen that the method of the invention is further characterized by providing the two mounting plates with connecting means spaced equally on either side of the connection recess provided in the first and second edge portions, thus permitting positioning of the mounting plates in either orientation relative to each other, in which the adjacent connection recesses of each plate can be in registration with each other. Preferably, at least one of the connection recesses in the first and second edge portions are aligned with each other, and are interconnected with sufficient material to provide communication between the aligned connection recesses when one of the recesses is drilled to produce an extension extending across the plate to interconnect with the other recess. Alternatively, the two mounting plates are provided with connection recesses on opposite edge portions spaced at equal distances from adjacent connecting means, so that the mounting plates can be secured together in either of two orientations in which at least one connection recess of one plate is in registration with a connection recess of another plate. These provisions further increase versatility of existing or new installations and permits easy transmission of pressure signals across interconnected plates.

Referring to FIGS. 8 and 9, the throttle boost circuit is attained by securing to the plate 156 the relay valve 142 at section A', the accumulator tank assembly 158 at section B' and the shuttle valve 145 at section C'. Before securing the components, interconnecting recesses and extensions of connection recesses are provided in the plate 156 as follows. The plate 11 is essentially similar to that of FIG. 7, but, as previously described, the plug 99 in the recess 55 is removed so that pilot pressure supplied to the assembly 37 is also supplied to the assembly 158 through the extensions 96 and 172. The third and fourth edge portions 163 and 164 respectively have connection recesses 178 and 179 which are connected respectively to the line 149 to the throttle actuator, and to the line 138 from the regulated air supply. The connection recess 177 communicates with a face recess 182, and an interconnecting recess 183 is made through a partition between the recess 182 and a face recess 185. An interconnecting recess 187 is made through a partition extending between face recesses 190 and 191 so as to interconnect the two said face recesses. The face recess 191 is deepened by drilling to communicate with the connection recess 178. A face recess 193 has adjacent each end thereof interconnecting recesses 195 and 196 which interconnect with adjacent face recesses 198 and 199 respectively. Face recesses 201 and 202 are drilled to interconnect with the extension 172, that is the transverse bore 174, so as to be exposed to pilot pressure from the plate 11. An interconnecting recess 205 is cut through a partition between the face recess 201 and an adjacent face recess 207. A generally similarly shaped face recess 209 is positioned adjacent the recess 207 for purposes as will be described. The connection recess 179 is drilled to produce an extension 180 which connects to a face recess 181, but it is noted that the extension 180 does not communicate with the face recess 199 due to relative positions of the extension 180 and the face recess 199. It can be seen that some of the face recesses used in the circuit of the plate 11 are also used in the circuit of the plate 156, although sometimes different portions of equivalent recesses are used. For example, the recesses 101 and 120 of the plate 11 are equivalent to the recesses 193 and 207 respectively of the plate 156, but fluid flows in different portions of the recesses in each case.

As seen only in FIG. 10, the plate 156 is used in conjunction with an intermediate plate 212 and a gasket 214 which are equivalent to the plate 44 and gasket 45 of FIGS. 2 and 5. The plate 212 and the gasket 214 have hole patterns similar to the plate 44 and the gasket 45 respectively, with the exception that the optional communication opening is provided at the position 48, instead of the position 46. This is shown diagrammatically in full outline in FIG. 9 in the face recess 209 and is necessary to provide pilot pressure to the pilot input port 30.3, ie. port #2 so as to close the relay valve as required. It is noted that the mounting face of the relay valve 142 is similar to the mounting face of the relay valve 68 of FIGS. 1 through 7, but that only one pilot input port, ie. the normally closed pilot port, is used in the relay valve 68, whereas both pilot input ports are used in the relay valve 142. Using both pilot input ports requires use of the optional opening at the position 48 with a corresponding hole in the gasket 214, together with cutting the recess 205 to interconnect the face recess 207. It can be seen that the face recesses 207 and 209 receive pilot pressure via the recess 205 and the opening 48 respectively, and represent in part the lines 151 and 152 respectively of FIG. 8. Comparing FIGS. 7 and 9, it is noted that the equivalent face recess, designated 120 in FIG. 7 or 207 in FIG. 9, can receive pilot pressure from either the optional opening 46 as used in FIG. 7, or from the interconnecting recess 205 as used in FIG. 9 and this applies to other circuits also. This versatility is attained by very simple changes to the structure which clearly is of major importance as such changes would not be impossible in a field situation remote from extensive workshop facilities.

In operation, clutch and throttle signals from the control head enter the plate 11 through the input connection recesses 50, 52 and 53 respectively. The clutch signals leave the plate 11 as previously described with reference to FIG. 7 through the output connection recesses 58 and 59 and are transmitted to the clutch-/gearbox assembly in lines 78 and 79. The throttle signal and pilot pressure signal are transmitted to the plate 156 as follows. The throttle signal from the recess 54, ie. the throttle delay output line 81, enters the recess 177 and passes into the shuttle valve 145 at section C' where, if the signal pressure is higher than the existing pressure in the shuttle input line 144, the delay signal passes from the shuttle valve out to the shuttle output line 149 to the throttle actuator without a throttle boost signal. The line 149 of FIG. 8 is represented by the recesses 190, 187, 191 and 178 of FIG. 9. The recesses 177, 182, 183 and 185 of FIG. 9 are represented by the line 81 of FIG. 8, and the recesses 199, 196, 193, 195 and 198 are represented by the line 144 of FIG. 8, providing two inputs into the shuttle valve. If the pressure in the shuttle input line 144 overcomes pressure in the line 81, a throttle boost signal is outputted by the shuttle valve in line 149 of FIG. 8. The throttle boost signal is generated as follows. The regulated air supply in the line 138 is represented in the plate 156 as the recess 179, the extension 180 and the face recess 181, from where the air pressure passes into the input port of the relay valve 142 at section A' of FIG. 9. Pilot pressure from the connection recess 55 of the plate 11 enters the transverse bore 174 as the clutch signal 147 and passes into the face recess 201 from where it divides into two portions representing the junction 150 of FIG. 8. One portion of the signal flows into the pilot input line 151 which feeds into pilot port #1 of the relay valve. The line 151 of FIG. 8 is represented in the plate 156 of FIG. 9 by the recesses 201, 205 and 207. The remaining portion of the pilot pressure signal enters the tank assembly from the recess 202, from where it passes first through the flow control and into the accumulator fluid tank 155. After a delay to charge up the accumulator tank reservoir the pilot signal enters the pilot pressure input port #2 of the relay valve 142 through the line 152, which is represented in the plate 156 of FIG. 9 by the face recess 209, which it enters via the opening 48. Thus, the two face recesses 207 and 209 supply two pilot pressures to the relay valve 142, and the spool of this valve will shift when force differential, including the spring force, changes. It is noted that build up of air pressure in the line 152, that is the recess 209, is delayed by the rate of pressure build up in the accumulator tank so that timing of the valve shift is controlled by the flow control. The output from the valve 142, which is in the line 144 in FIG. 8, is shown in FIG. 9 to flow in sequence through the recesses 199, 196, 193, 195 and 198 into the other input port of the shuttle valve. If the pressure in the line 144 of FIG. 8 is higher than the pressure in line 81 from the plate 11, the shuttle shifts and the throttle boost signal exits from the shuttle valve via the shuttle output line 149 to the throttle actuator. As previously stated, the line 149 of FIG. 8 is represented by the recesses 190, 187, 191 and 178 in FIG. 9. Similarly to FIG. 7, the check valve 153 in the port 201 exhausts excess fluid pressure from the reservoir 155 as required.

Clearly, many other circuits can be established using the preformed face recesses in the plate 11, interconnected in patterns other than the particular patterns described with reference to FIGS. 7 and 9. Other face recesses and connection recesses can also be utilized whilst maintaining the same positions of the components on the plate.

I claim:

1. A mounting assembly for coupling together a plurality of fluid actuated components utilizing a pressurized fluid, each component having a mounting base with ports to receive and to discharge fluid and being adapted to be secured to the mounting assembly with fasteners, the mounting assembly including:

(a) a mounting plate having a main face with a first face recess separated from an adjacent second face recess by a partition, the recesses being within the face and having open outer portions and closed inner portions, a portion of the partition being adapted to be removed to provide communication between the first and second face recesses, the mounting plate having edge portions with edge faces disposed generally perpendicularly to the main face and containing input and output connection recesses adapted to receive and to discharge fluid respectively and to communicate with the face recesses as required, the connection recesses having central axes within a plane disposed parallel to the main face of the plate, the plate also having fastener openings to receive the fasteners for securing the components to the assembly, an intermediate plate adapted to fit between the components and the mounting plate and to be secured and sealed thereto so as to seal the open outer portions of the face recesses to form passages through the mouting assembly, the intermediate plate being relatively thin and having communication openings therein adapted to register with the ports of the components and to communicate with particular adjacent face recesses within the mounting plate as required, and clearance openings to accept the fasteners.

2. A mounting assembly as claimed in claim 1 in which:

(a) the main face is defined in part by first and second edge portions which are spaced apart on opposite sides of the mounting plate, (b) the input and output connection recesses are in the first and second edge portions respectively, and are aligned with each other and are interconnected with sufficient material of the plate to provide communcation between the aligned connection recesses so that a transverse bore can be formed to extend between the first and second edge portions of the plate, (c) connecting means are provided to connect two similar mounting plates together with the two edge portions containing the connection recesses adjacent each other, so as to form a mounting plate composite assembly so that at least one connection recess on one plate is in registration with a connection recess on the other plate.

3. A mounting assembly as claimed in claim 2 in which:

(a) the connecting means are spaced equally on opposite sides of the aligned connection recesses of each plate, so that relative positions of the two mounting plates can be reversed and the aligned connection recesses of the two plates can register with each other in either of the relative positions of the mounting plates.

4. A mounting assembly as claimed in claim 2 in which:

(a) at least one of the connection recesses on each opposite edge portion of the mounting plate is at an equal distance from a respective adjacent connecting means to enable coupling together of adjacent mounting plates in either of the two orientations with registration of at least two connection recesses.

5. A mounting assembly as claimed in claim 2, 3 or 4 in which the connecting means are characterized by:

(a) brackets generally aligned with edge portions containing the connection recesses which are adapted to register with the connection recesses of the adjacent plate, (b) couplers cooperating with the brackets to draw the plates together to attain the registration of the connection recesses.

6. A mounting assembly as claimed in claim 1 in which the mounting assembly is for a pneumatic marine control delay circuit utilizing an accumulator tank assembly and a pneumatic relay valve, the mounting assembly being further characterized by:

(a) a face recess communicating with a first opening in the intermediate plate in register with an output port of the accumulator tank assembly, (b) the face recess is in communication with a second opening in the intermediate plate in registration with a pilot input port of the relay valve, so that fluid from the accumulator tank communicates with the relay valve to control actuation thereof.

7. A mounting assembly as claimed in claim 1 further characterized by:

(a) the main face of the first mounting plate being defined in part by first and second edge portions which are spaced apart on opposite sides of the mounting plate and contain the input and output connection recesses respectively, (b) a second mounting plate and intermediate plate which are generally similar to the first mounting plate and the first intermediate plate, with partitions being removed as required to accomodate a second plurality of fluid actuated components secured to form a second mounting assembly, the second mounting assembly having an input connection recess receiving fluid from the output connection recess of the first mounting plate, (c) each mounting plate having connecting means cooperating with couplers to connect the two mounting plates together with two edge portions containing the connection recesses being adacent each other.

8. A method of connecting together on a mounting assembly a plurality of fluid actuated components utilizing a pressurized fluid, in which each component has a mounting face with ports to receive and to discharge fluid and is adapted to be secured to the mounting assembly with fasteners, the method including:

(a) providing a mounting plate having a main face with a first face recess separated from an adjacent second face recess by a partition, the recesses being within the main face and having open outer portions and closed inner portions, the mounting plate also having edge portions with edge faces disposed generally perpendicularly to the main face and containing input and output connection recesses adapted to receive and to discharge fluid respectively, the connection recesses having central axes within a plane disposed parallel to the main face of the plate, the mounting plate also having fastener openings to receive the fasteners for securing the components to the assembly, (b) removing a portion of the partition between the first and second face recesses to provide communication between the two face recesses, and removing material if required to permit the input and output connection recesses to communicate with the face recesses as required, (c) forming the mounting assembly by fitting a relatively thin intermediate plate between the components and the mounting plate so as to seal the open outer portions of the recesses to form passages through the mounting assembly, the intermediate plate having communication openings therein to register with the ports of the components and adjacent face recesses as required to permit communications between the face recesses and the components, the intermediate plate also having clearance openings to accept the fasteners, (d) securing and sealing the components and the intermediate plate to the mounting plate by passing the fasteners through the components and the clearance openings of the intermediate plate, so as to form an assembly in which the components are interconnected as required, and fluid passes from the input connection recess, through the components and the face recesses as required, and leaves the assembly through the output connection recess.

9. A method as claimed in claim 8 in which the main face has first and second edge portions spaced apart on opposite sides of the mounting plate, and in which the method is further characterized by:

(a) inputting fluid into the mounting plate by a connection recess provided in the first edge portion of the mounting plate, (b) outputting fluid from the mounting plate through a connection recess provided in the second edge portion of the mounting plate.

10. A method as claimed in claim 9 in which at least one of the connection recesses in first or second edge portion is blind, and the method is further characterized by:

(a) extending the blind connection recess by drilling to form an extension thereof, until the extension communicates with a particular face recess to pass fluid between the first and second edge portions.

11. A method as claimed in claim 8 in which two mounting assemblies are to be assembled together with couplers to produce a mounting plate composite assembly, the method being further characterized by:

(a) providing two mounting plates, each mounting plate having face recesses in the main face thereof with partitions separating the face recesses and connection recesses adjacent the first and second edge portions thereof, (b) also providing each mounting plate with connecting means adjacent third and fourth edge portions thereof, the connecting means and the couplers being adapted to connect the two mounting plates together to form a mounting plate composite assembly with adjacent connection recesses of each mounting plate being in registration with each other to permit passing of fluid therebetween.

12. A method as claimed in claim 11 further characterized by:

(a) providing the two mounting plates with connection recesses in the first and second edge portions in which the connection recesses are aligned with each other, and also providing sufficient material to provide communication between the aligned connection recesses, (b) providing the two mounting plates with connecting means spaced equally one either side of the aligned connection recess, (c) drilling the aligned connection recesses of at least one particular mounting plate assembly to produce a transverse bore to extend across the particular mounting plate to interconnect the aligned connection recesses, (d) positioning and securing together with the couplers the mounting plates in a first orientation relative to each other, which can be reversed to obtain a second orientation, the transverse bore of the particular mounting plate being in registration with an aligned connection recess in the remaining plate in either of the orientations.

13. A method as claimed in claim 11 further characterized by:

(a) providing the two mounting plates with at least one of the connection recesses on each opposite edge portion at an equal distance from an adjacent connecting means, (b) positioning and securing together the mounting plates in either of two orientations in which at least one connection recess of one plate is in registration with a connection recess of the other plate.

* * * * *